United States Patent
Kojima

(10) Patent No.: US 10,270,619 B2
(45) Date of Patent: Apr. 23, 2019

(54) IN-VEHICLE RECORDING SYSTEM AND IN-VEHICLE CONTROL APPARATUS

(71) Applicant: TOYOTA JIDOSHA KABUSHIKI KAISHA, Toyota-shi, Aichi-ken (JP)

(72) Inventor: Takashi Kojima, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/266,303

(22) Filed: Sep. 15, 2016

(65) Prior Publication Data

US 2017/0111183 A1   Apr. 20, 2017

(30) Foreign Application Priority Data

Oct. 20, 2015   (JP) ................................. 2015-206663

(51) Int. Cl.
   *H04L 12/40* (2006.01)
   *G07C 5/08* (2006.01)
   *H04L 29/08* (2006.01)

(52) U.S. Cl.
   CPC ........ *H04L 12/40169* (2013.01); *G07C 5/085* (2013.01); *G07C 5/0841* (2013.01);
   (Continued)

(58) Field of Classification Search
   CPC ............ G07C 5/0841; H04L 12/40006; H04L 12/40169; H04L 2012/40273; H04L 67/12
   See application file for complete search history.

(56) References Cited

U.S. PATENT DOCUMENTS

| 8,520,695 B1 | 8/2013 | Rubin et al. |
| 9,248,841 B1 | 2/2016 | MacNeille et al. |

(Continued)

FOREIGN PATENT DOCUMENTS

| CN | 104487309 A | 4/2015 |
| JP | 2000-293499 A | 10/2000 |

(Continued)

OTHER PUBLICATIONS

Jun. 25, 2018 Notice of Allowance issued in U.S. Appl. No. 15/348,317.

(Continued)

*Primary Examiner* — Quan-Zhen Wang
*Assistant Examiner* — Rajsheed O Black-Childress
(74) *Attorney, Agent, or Firm* — Oliff PLC

(57) ABSTRACT

An in-vehicle control apparatus is connected with a gateway apparatus via a first in-vehicle network, and transmits a state of a trigger for recording state data representing a state of a vehicle and the like on a non-volatile memory. The in-vehicle control apparatus includes a determination unit to determine whether predetermined events have been generated; a setting unit to set the state of the trigger of the generated event, to a satisfied state; a transmission process unit to transmit a communication frame that conveys the state of the trigger for each event, to the first in-vehicle network; and a latch process unit to maintain the satisfied state of the trigger until a predetermined time passes, and to change the state of the trigger from satisfied to unsatisfied after the predetermined time has passed, for each of the triggers.

4 Claims, 12 Drawing Sheets

(52) U.S. Cl.
CPC ........ *H04L 12/40006* (2013.01); *H04L 67/12* (2013.01); *H04L 67/2842* (2013.01); *H04L 2012/40273* (2013.01)

(56) References Cited

U.S. PATENT DOCUMENTS

| | | | |
|---|---|---|---|
| 9,327,841 B1 | 5/2016 | Sipper et al. | |
| 9,800,319 B2* | 10/2017 | Nakagawa | H04B 7/15528 |
| 10,102,696 B2* | 10/2018 | Iwaasa | B60W 50/08 |
| 2007/0280505 A1 | 12/2007 | Breed | |
| 2008/0150786 A1 | 6/2008 | Breed | |
| 2009/0033540 A1 | 2/2009 | Breed et al. | |
| 2010/0332072 A1* | 12/2010 | Ishiko | B60T 17/221 |
| | | | 701/29.5 |
| 2013/0166778 A1* | 6/2013 | Ishigooka | H04L 12/4035 |
| | | | 709/248 |
| 2014/0257594 A1 | 9/2014 | Hashimoto et al. | |
| 2014/0306799 A1 | 10/2014 | Ricci | |
| 2014/0306817 A1 | 10/2014 | Ricci | |
| 2015/0191176 A1 | 7/2015 | Kobana et al. | |
| 2015/0332519 A1* | 11/2015 | Hiura | G07B 15/00 |
| | | | 701/33.4 |
| 2015/0360698 A1 | 12/2015 | Beyene et al. | |
| 2016/0055747 A1 | 2/2016 | Ricci | |
| 2016/0065298 A1* | 3/2016 | Nakagawa | H04B 7/15528 |
| | | | 370/315 |
| 2016/0082978 A1 | 3/2016 | Ozaki et al. | |
| 2016/0364921 A1 | 12/2016 | Iyoda et al. | |
| 2017/0111183 A1 | 4/2017 | Kojima | |
| 2017/0132710 A1 | 5/2017 | Duncan et al. | |
| 2017/0148237 A1 | 5/2017 | Iwaasa | |

FOREIGN PATENT DOCUMENTS

| | | |
|---|---|---|
| JP | 2010-166160 A | 7/2010 |
| JP | 2012-003607 A | 1/2012 |
| JP | 2012-156803 A | 8/2012 |
| JP | 2013-073610 A | 4/2013 |
| JP | 2014-211756 A | 11/2014 |
| JP | 2014-219814 A | 11/2014 |
| JP | 2015-162068 A | 9/2015 |
| JP | 2015-194938 A | 11/2015 |
| JP | 2017-079406 A | 4/2017 |
| WO | 2013-057842 A1 | 4/2013 |

OTHER PUBLICATIONS

Mar. 2, 2018 Notice of Allowance issued in U.S. Appl. No. 15/348,317.

May 17, 2018 Supplemental Notice of Allowability issued in U.S. Appl. No. 15/348,317.

U.S. Appl. No. 15/348,317, filed Nov. 10, 2016 in the name of Shintaro Iwaasa.

Jul. 11, 2018 Supplemental Notice of Allowability issued in U.S. Appl. No. 15/348,317.

* cited by examiner

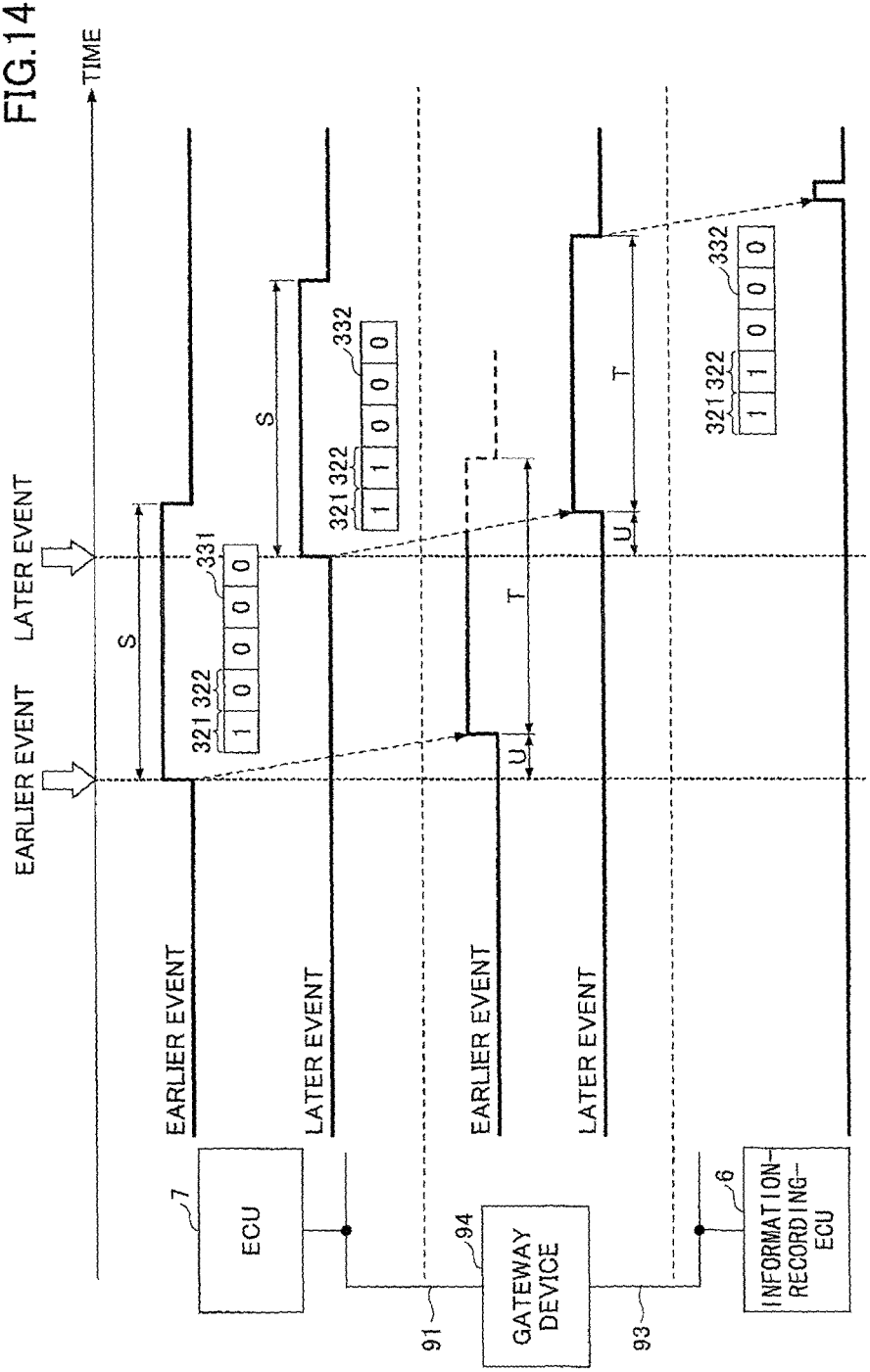

IN-VEHICLE RECORDING SYSTEM AND IN-VEHICLE CONTROL APPARATUS

FIELD

The present disclosure relates to an in-vehicle recording system and an in-vehicle control apparatus.

BACKGROUND

Conventionally, a system has been known that records detection data received from an ECU (Electronic Control Unit) via an in-vehicle network, on a non-volatile memory, when an event such as a collision of a vehicle has been detected (see, for example, Patent Document 1). This system includes a gateway ECU that relays data communication so that the detection data can be transmitted and received between ECUs connected to different in-vehicle networks.

RELATED-ART DOCUMENTS

Patent Documents

[Patent Document 1] Japanese Laid-open Patent Publication No. 2012-156803

An in-vehicle recording system that records vehicle data representing states of the vehicle on a non-volatile memory, often records the vehicle data by an event-driven method due to a limited total memory capacity of the non-volatile memory. The mechanism is, for example, to transmit a state of a trigger to record vehicle data corresponding to an event, such as a collision, on the non-volatile memory, to an in-vehicle network when the event is generated, and to record the vehicle data on the non-volatile memory, based on the state of the trigger received from the in-vehicle network.

However, a relaying delay is generated while the gateway device relays the state of the trigger, in an aspect where the state of the trigger is transmitted and received between different in-vehicle networks via the gateway device. Therefore, if different events are generated consecutively, the gateway device may write a state of a trigger in a communication frame transmitted when a later event is detected, over a state of a trigger in a communication frame transmitted when an earlier event has been detected.

For example, FIG. 1 illustrates a case example in which a transmitter-ECU 201 has transmitted a first communication frame 231 that includes a state "1" of a first trigger 221 corresponding to an earlier event, and then, transmits a second communication frame 232 that includes a state "1" of a second trigger 222 corresponding to a later event. In this case, having determined that the earlier event has been generated, the transmitter-ECU 201 transmits the first communication frame 231 having the state of the first trigger 221 corresponding to the earlier event set to "1", to issue a command to a receiver-ECU 202 to record vehicle data corresponding to the earlier event on a non-volatile memory. Then, having determined that the later event has been generated, the transmitter-ECU 201 transmits the second communication frame 232 having the state of the second trigger 222 corresponding to the later event set to "1", to issue a command to a receiver-ECU 202 to record vehicle data corresponding to the later event on the non-volatile memory. Note that both the first communication frame 231 and the second communication frame 232 in the FIGURE schematically illustrate examples of a data frame that can convey five states of respective triggers.

However, the gateway device 203 needs a relaying delay time T for relaying a communication frame from the first in-vehicle network 211 to the second in-vehicle network 212 (namely, after the gateway device 203 has received the communication frame from the first in-vehicle network 211 until transmitting the frame to the second in-vehicle network 212). Therefore, if receiving the second communication frame 232 within the relaying delay time T after having received the first communication frame 231 from the first in-vehicle network 211, the gateway device 203 relays the second communication frame 232 to the second in-vehicle network 212 without relaying the first communication frame 231. Consequently, the receiver-ECU 202 on the side of the second in-vehicle network 212, cannot obtain the state "1" of the first trigger 221 corresponding to the earlier event, and hence, cannot record the vehicle data corresponding to the earlier event on the non-volatile memory.

Thereupon, it is an object of an embodiment to make it possible for a gateway apparatus to relay a satisfied state of a trigger corresponding to an earlier event, even if different events are generated consecutively.

SUMMARY

According to a first aspect, an in-vehicle recording system includes a first control apparatus configured to transmit to a first in-vehicle network a state of a trigger for recording state data that represents a state of a vehicle or an occupant of the vehicle, on a non-volatile memory; a gateway apparatus configured to relay the state of the trigger transmitted to the first in-vehicle network, from the first in-vehicle network to a second in-vehicle network; and a second control apparatus configured to receive from the second in-vehicle network, the state of the trigger relayed by the gateway apparatus from the first in-vehicle network to the second in-vehicle network. The first control apparatus includes a generated event determination unit configured to determine whether a plurality of predetermined events have been generated in the vehicle, for each of the events; a trigger state setting unit configured to set the state of the trigger corresponding to the event having been determined as generated in the vehicle by the generated event determination unit, to a satisfied state; a transmission process unit configured to transmit a communication frame that conveys the state of the trigger for each of the events, to the first in-vehicle network. The gateway apparatus includes a relay process unit configured to relay a second communication frame from the first in-vehicle network to the second in-vehicle network, without relaying a first communication frame, in a case where the gateway apparatus has received the second communication frame different from the first communication frame from the first in-vehicle network after having received the first communication frame from the first in-vehicle network, before relaying the first communication frame to the second in-vehicle network. The second control apparatus includes a data recording unit configured to record the state data corresponding to the trigger set to the satisfied state among the triggers of the events in a communication frame received from the second in-vehicle network, on the non-volatile memory. The first control apparatus includes a latch process unit configured to execute a latch process for maintaining the state of the trigger set to the satisfied state until a predetermined time passes since the trigger state setting unit has set the state of the trigger to the satisfied state, and changing the state of the trigger from the satisfied state to an unsatisfied state after the predetermined time has passed, for each of the triggers of the events.

According to the first aspect, if the generated event determination unit has determined that one of the events has been generated (referred to as a "first event", below), a communication frame to convey a satisfied state of a trigger corresponding to the first event (first communication frame) is transmitted by the transmission process unit. Also, if the generated event determination unit has determined that the first event has been generated, the satisfied state of the trigger corresponding to the first event is maintained by the latch process unit until the predetermined time passes.

Therefore, after the generated event determination unit has determined that the first event has been generated, if an event different from the first event (referred to as a "second event", below) is generated in the predetermined time, the transmission process unit can transmit to the first in-vehicle network a communication frame (a second communication frame) that conveys the satisfied state of the trigger corresponding to the earlier first event and the satisfied state of the trigger corresponding to the later second event.

Therefore, by the gateway apparatus that receives the second communication frame from the first in-vehicle network before relaying the first communication frame to the second in-vehicle network, the second communication frame can be relayed to the second in-vehicle network even if the first communication frame is not relayed to the second in-vehicle network. Therefore, even if different events are generated consecutively, the gateway apparatus can relay the satisfied state of the trigger corresponding to the earlier first event to the second in-vehicle network.

Also, according to a second aspect, the predetermined time is greater than or equal to a total time of a first delay time after a communication frame has been transmitted to the first in-vehicle network until the communication frame is received by the gateway apparatus, and a second delay time for relaying the communication frame from the first in-vehicle network to the second in-vehicle network by the gateway apparatus.

According to the second aspect, if the generated event determination unit has determined that the first event has been generated, the satisfied state of the trigger corresponding to the first event is maintained by the latch process unit for the total time or longer. Therefore, if the generated event determination unit has determined that the first event has been generated, and then, a second event different from the first event is generated after the total time or later, the transmission process unit can transmit to the first in-vehicle network a second communication frame that conveys the satisfied state of the trigger corresponding to the earlier first event and the satisfied state of the trigger corresponding to the later second event. Therefore, even if different events are generated consecutively within the total time, the gateway apparatus can relay the satisfied state of the trigger corresponding to the earlier first event to the second in-vehicle network.

Other aspects in the present disclosure can be implemented as an in-vehicle control apparatus.

According to an aspect in the present disclosure, even if different events are generated consecutively, a gateway apparatus can relay a satisfied state of a trigger corresponding to an earlier event.

BRIEF DESCRIPTION OF DRAWINGS

FIG. 14 is a timing chart that illustrates an example of operations of an in-vehicle recording system according to an embodiment.

DESCRIPTION OF EMBODIMENTS

In the following, embodiments will be described with reference to the drawings.

Figure 1:
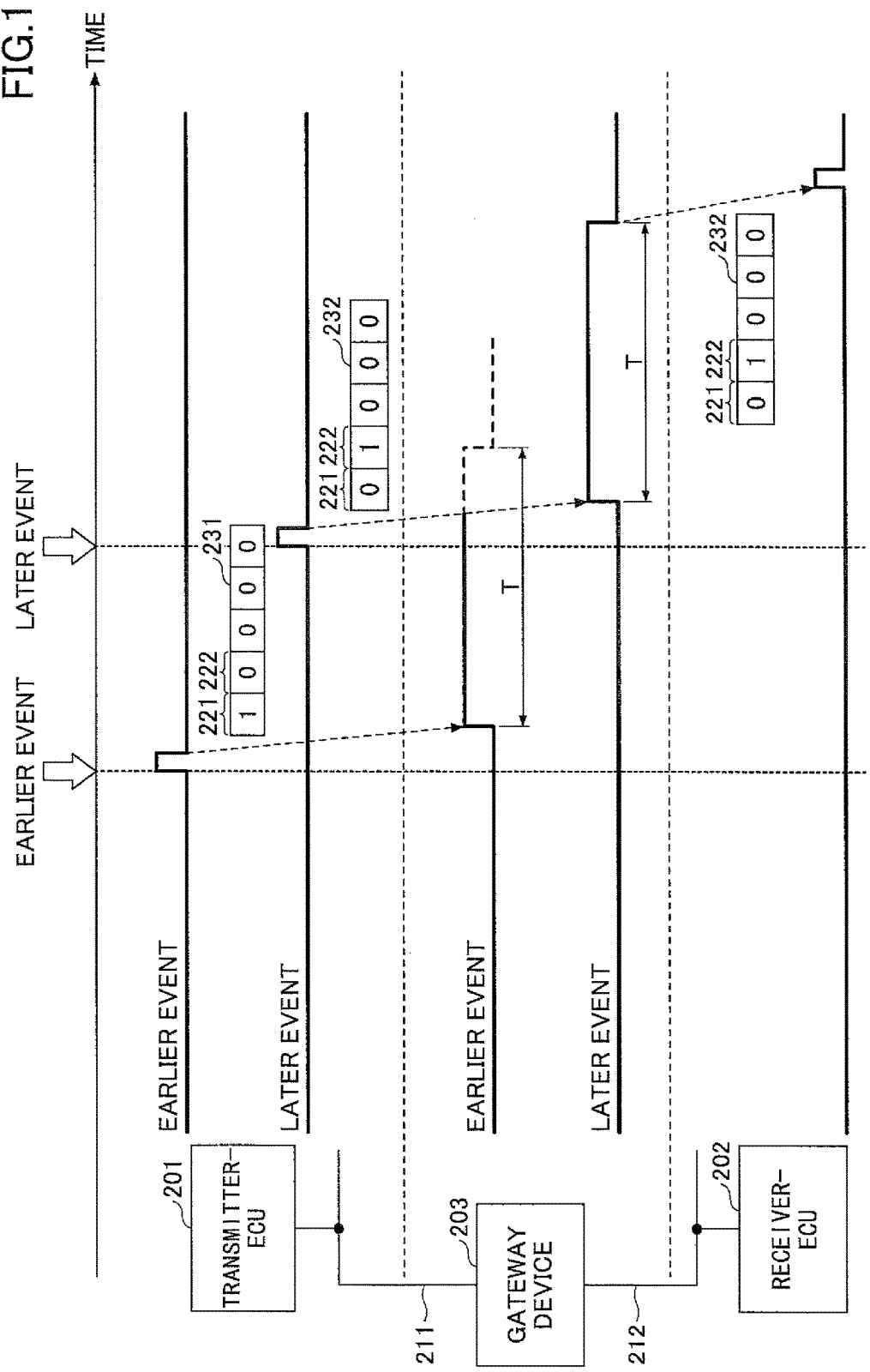
FIG. 1 is a timing chart that illustrates an example (a comparative example) of operations for transmitting communication frames by a transmission-ECU when different events are generated consecutively.
Figure 2:
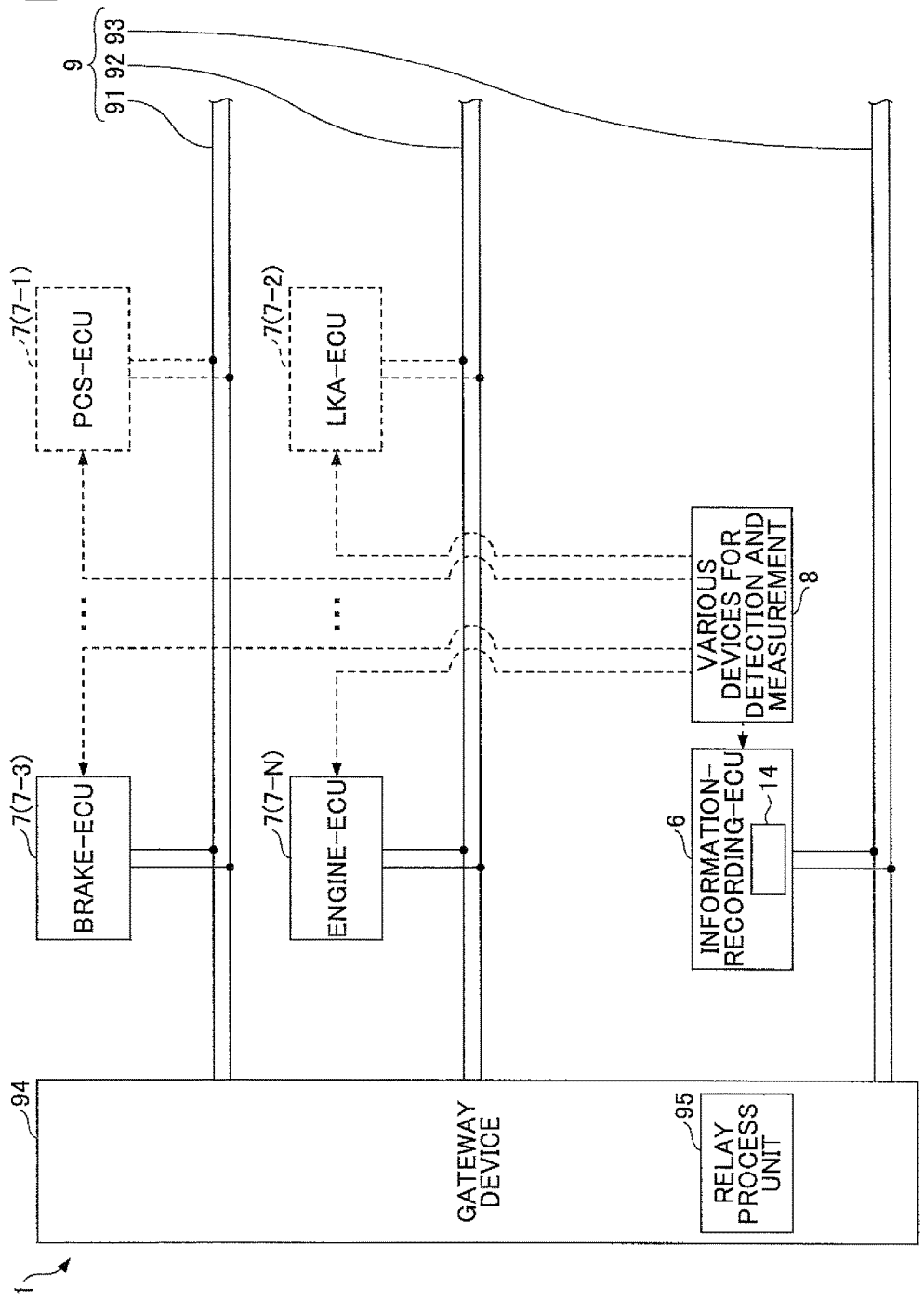
FIG. 2 is a configuration diagram that schematically illustrates an example of a configuration of an in-vehicle recording system.

FIG. 2 is a configuration diagram that schematically illustrates an example of a configuration of an in-vehicle recording system 1 according to an embodiment. The in-vehicle recording system 1 is installed on a vehicle, and upon detecting a type of an event specified in advance, records state data that represents a state of the vehicle or an occupant of the vehicle (also referred to as "vehicle data", below) specified in advance for each type of an event. In the following, the "vehicle" refers to a vehicle having the in-vehicle recording system 1 installed unless particularly noted.

Note that an "event" is an event of the vehicle caused by, for example, a control value calculated for controlling the vehicle, or an operational signal output following an operation by an occupant of the vehicle (a driver or the like). Types of events to be detected are specified in advance depending on purposes of analysis and the like. For example, the events to be detected include actuation of a specific drive support function (an alarm control function, an intervention control function, or the like) that is executed when a specific condition is satisfied. The alarm control functions include an alarm to avoid a collision with an obstacle ahead of the vehicle (referred to as "PCS alarming", below), an LDA (Lane Departure Alert), and a CTA (Cross Traffic Alert). Also, the intervention control functions are control functions executed irrespective of an operation by the driver, including automatic braking to avoid a collision with an obstacle ahead of the vehicle (referred to as "PCS braking", below), VSC (Vehicle Stability Control), an ABS (Anti-lock Brake System), TRC (Traction Control), and LKA (Lane Keeping Assist). The events to be detected may also include, for example, an event caused by a specific operation. The events caused by specific operations include simultaneous occurrence of an acceleration signal (to make the accelerator opening greater than zero) and a brake signal (the amount of a brake pedal operation greater than zero); an accelerator opening taking an intermediate opening or greater in the N range; sudden braking (to an extent to actuate ABS in a rainy weather); emergency braking (more emergent than sudden braking); and sudden turning. Also, the events also include, for example, detection of a collision between the vehicle and another object, and the vehicle passing a specific position. The following description assumes that J types of events are specified to be detected (where J is an integer greater than or equal to two). Also, an "event to be detected" may be rephrased as an "event whose occurrence needs to be determined".

Also, the "state of the vehicle" is a notion including motional states of the vehicle (acceleration, speed, and the like based on sensor values or calculated values); control states of the vehicle (actuation commands and command values for controlling); traveling states of the vehicle (the distance to a preceding vehicle, the traveling lane, and the like based on sensor values or calculated values); operational states of the vehicle (amounts of the accelerator opening, a brake operation, and the like based on sensor values); environmental states of the vehicle (temperatures in and out the compartment, raindrop, and the like based on sensor values); and the like. The "state of an occupant of the vehicle" is a notion including a state of each occupant of the vehicle (including the driver), for example, an image of the driver obtained from a camera sensor. Types of vehicle data items to be recorded are specified in advance for respective types of the events as described above. This is because useful vehicle data items for analysis may be different for respective types of the events. Also, two or more vehicle data items to be recorded may be specified for a type of an event.

As illustrated in FIG. 2, the in-vehicle recording system 1 includes a CAN (Controller Area Network) 9 as an example of an in-vehicle network, a gateway device 94, an information-recording-ECU (Electronic Control Unit) 6 and various ECUs 7 connected via a gateway device 94, and various devices for detection and measurement 8 connected with the information-recording-ECU 6 and the various ECUs 7 to be capable of communicating with each other. The information-recording-ECU 6 is disposed at, for example, at a lower part of the center console in the vehicle compartment.

The CAN 9 includes CAN buses 91 to 93. The CAN buses 91 to 93 are connected with each other via the gateway device 94. The various ECUs 7 are connected with the CAN bus 91 or the CAN bus 92; the information-recording-ECU 6 is connected with the CAN bus 93; and the information-recording-ECU 6 and the various ECUs 7 are connected via the gateway device 94 to be capable of communicating with each other by the CAN protocol.

Note that the connection of the information-recording-ECU 6 and the various ECUs 7 in the embodiment is just an example. One of the various ECUs 7 is an example of a first control apparatus or an in-vehicle control apparatus to transmit to a first in-vehicle network a state of a trigger for recording state data that represents a state of a vehicle or an occupant of the vehicle, on a non-volatile memory. The gateway device 94 is an example of a gateway apparatus configured to relay the state of the trigger transmitted to the first in-vehicle network (which will be described in detail later), from the first in-vehicle network to a second in-vehicle network. The information-recording-ECU 6 is an example of a second control apparatus configured to receive the state of the trigger relayed by the gateway apparatus from the first in-vehicle network to the second in-vehicle network, from the second in-vehicle network. The CAN bus 91 and the CAN bus 92 are examples of a first in-vehicle network, and the CAN bus 93 is an example of a second in-vehicle network.

Figure 3:
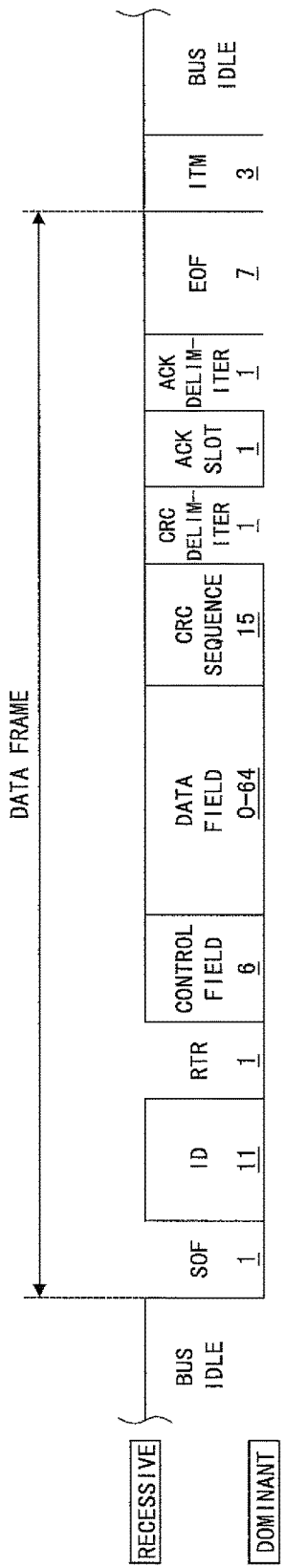
FIG. 3 is a diagram that illustrates an example of frame types in the CAN protocol.

A CAN frame in the standard format of the CAN protocol (a data frame) has a structure as illustrated in FIG. 3 (a diagram that illustrates an example of a frame type in the CAN protocol). Specifically, the CAN frame is constituted with SOF (Start Of Frame, 1 bit), ID (11 bits), RTR (1 bit), control field (6 bits), data field (0 to 64 bits), CRC sequence (15 bits), CRC delimiter (1bit), ACK slot (1 bit), ACK delimiter (1 bit), and EOF (End Of Frame, 7 bits). Data transmitted by the CAN frame is included in the data field, and eight bytes of data at the maximum can be transmitted by the CAN frame, by units of bytes. The length of data included in the CAN frame is set between 0 and 8 by 4-bit DLC (Data Length Code) in the control field.

ID is used for identifying data content, a transmission node, or the like, and has a function to determine the priority in communication arbitration in the CAN 9 (arbitration in a case where communication frames are output on the CAN buses 91 to 93 from multiple nodes at the same time), in which a smaller ID has a higher priority. The length of 11 bits of ID covers a range between 0x0 to 0x7FF (hexadecimal), and at most 2048 identifiers can be assigned as ID. Also, a CAN frame in the extended format of the CAN protocol (not illustrated) includes extended ID (18 bits) in addition to the base ID (11 bits) that corresponds to the ID in the standard format. Therefore, the length of 29 bits of combined base ID and extended ID covers a range between 0x0 to 0x1FFFFFFF (hexadecimal), and at most about 5.4 million identifiers can be assigned as the combined ID.

In this way, the information-recording-ECU 6 and the various ECUs 7 transmit and receive CAN frames in the CAN 9 following IDs assigned in advance, to be capable of identifying the CAN frames on the CAN 9 (the CAN buses 91, 92, and 93) to receive required data. In the following, an ID in the standard format, and a combined ID of base ID and extended ID in the extended format, will be referred to as a "CAN-ID".

In FIG. 2, the gateway device 94 includes a relay process unit 95. If having received a first CAN frame from the CAN bus 91 or the CAN bus 92, and then, receiving a second CAN frame from the CAN bus 91 or the CAN bus 92 that is different from the first CAN frame before relaying the first CAN frame to the CAN bus 93, the relay process unit 95 relays the second CAN frame from the CAN bus 91 or the CAN bus 92 to the CAN bus 93, without relaying the first CAN frame. It is assumed that the second CAN frame has the same CAN-ID assigned as the first CAN frame. The first CAN frame is an example of a first communication frame, and the second CAN frame is an example of a second communication frame.

Figure 4:
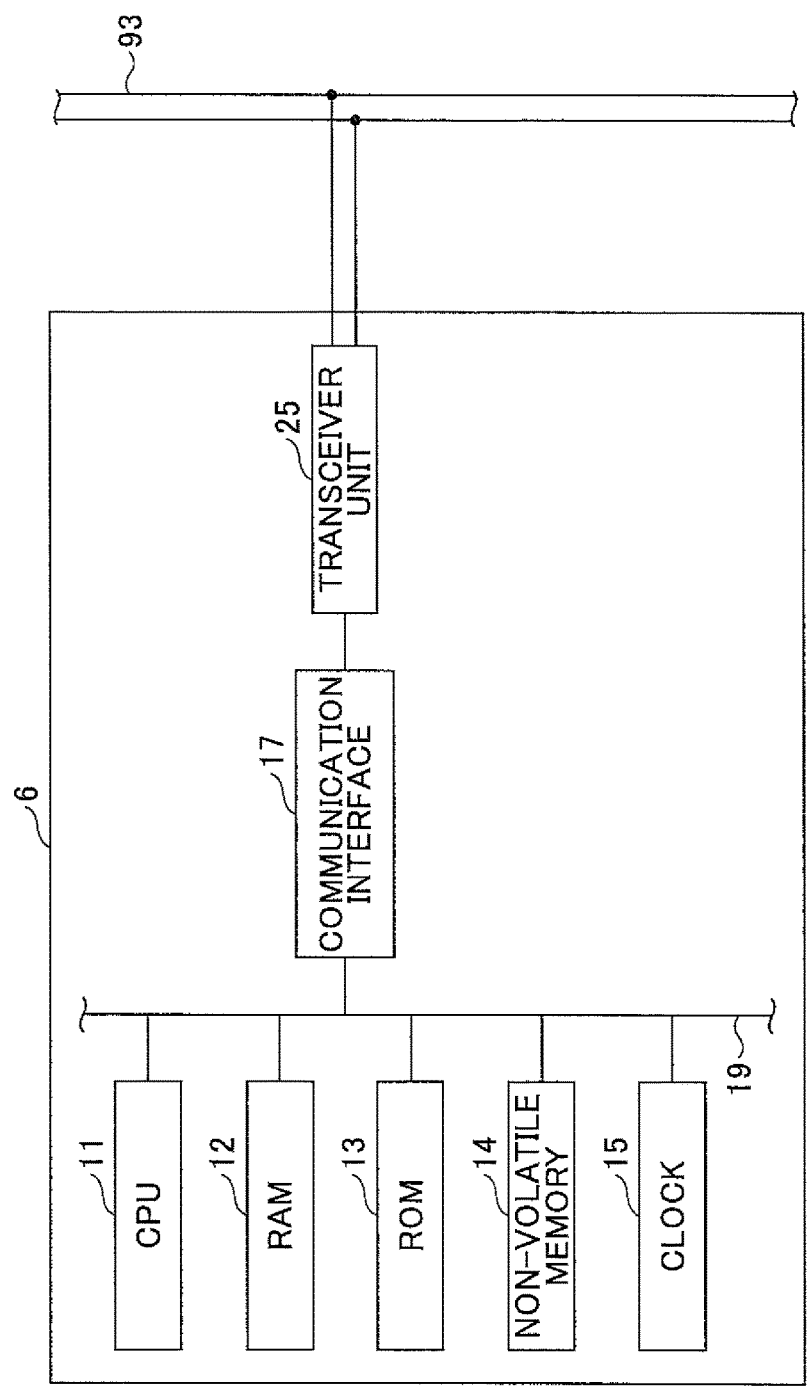
FIG. 4 is a configuration diagram that schematically illustrates an example of a hardware configuration of an information-recording-ECU.

FIG. 4 is a configuration diagram that schematically illustrates an example of a hardware configuration of the information-recording-ECU 6.

The information-recording-ECU 6 includes a CPU 11, a RAM 12, a ROM 13, a non-volatile memory 14, a clock 15, and a communication interface 17, which are connected with each other via an internal bus 19, and a transceiver unit 25 connected to a communication interface 17.

The non-volatile memory 14 is, for example, an EEPROM (Electrically Erasable Programmable Read-Only Memory). A memory having a comparatively low-capacity, for example, from several dozen KB to several hundred KB may be adopted as the non-volatile memory 14 from the viewpoint of installation space and cost. Also, the transceiver unit 25 includes a CAN transceiver and a CAN driver, and is connected with the CAN bus 93. The transceiver unit 25 also includes a transceiver unit that is capable of communicating with the various devices for detection and measurement 8, by using any communication line (for example, the CAN 9, a LIN (Local Interconnect Network), or a one-to-one communication line).

Figure 5:
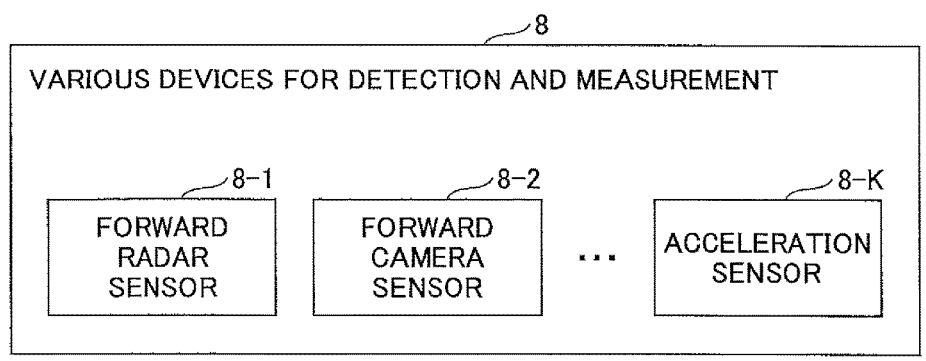
FIG. 5 is a configuration diagram that schematically illustrates an example of a configuration of various devices for detection and measurement.

FIG. 5 is a configuration diagram that schematically illustrates an example of a configuration of the various devices for detection and measurement 8.

The various devices for detection and measurement 8 are various sensors and the like installed on the vehicle, and as designated in FIG. 2 by dotted-line arrows, connected with the information-recording-ECU 6 and the various ECUs 7 (ECU 7A-1 to 7A-N, and 7B-1 to 7B-M) to be capable of communicating with each other via an arbitrary communication line (for example, the CAN 9, a LIN, or a one-to-one communication line). The various devices for detection and measurement 8 include, for example, a forward radar sensor 8-1, a forward camera sensor 8-2, . . . , and an acceleration sensor 8-K. In the following, a device for detection and measurement 8-h (h=1, 2, . . . , K) refers to one of the devices for detection and measurement 8-1 to 8-K.

Referring back to FIG. 2, the various ECUs 7 are control apparatuses to execute vehicle control, to execute control relating to predetermined types of events specified in advance among ECUs installed on the vehicle. Each of the various ECUs 7 executes control relating to one or more types of events. The various ECUs 7 include ECUs 7-1 to 7-N that execute control relating to events such as actuation of drive support functions and the like. For example, the various ECUs 7 include the PCS-ECU 7-1, the LKA-ECU 7-2, the brake-ECU 7-3, . . . , and the engine-ECU 7-N. In the following, an ECU 7-i (1=1, 2, . . . , N) refers to an arbitrary one of the ECUs 7-1 to 7-N.

The PCS-ECU 7-1 executes control relating to a function of PCS alarming and a function of PCS braking (control for implementing the function of PCS alarming and the function of PCS braking). Also, the LKA-ECU 7-2 executes control relating to a function of LKA (control for implementing the function of LKA). Also, the brake-ECU 7-3 executes control relating to a function of ABS and a function of VCS (control for implementing the function of ABS and the function of VCS). Also, the engine-ECU 7-N executes control relating to a function of TRC (control for implementing the function of TRC).

Note that the various ECUs 7 (ECU 7-i) and the various devices for detection and measurement 8 (device for detection and measurement 8-h) described above, functions as a vehicle data generation unit that generates vehicle data described above. Which ECU 7-i or device for detection and measurement 8-h functions as the vehicle data generation unit for a particular case depends on a type of vehicle data specified in advance for each type of an event to be detected (type of vehicle data to be written). For example, if vehicle data to be written is about acceleration of the vehicle, the vehicle data generation unit is implemented by the acceleration sensor 8-K. Alternatively, if vehicle data to be written is about a control command value of the brake-ECU 7-3, the vehicle data generation unit is implemented by the brake-ECU 7-3. Also, vehicle data to be written may include detection information by the forward radar sensor 8-1, a captured image by the forward camera sensor 8-2, an acceleration signal, a control command value of a drive device, a history of various control related flags that have been satisfied, diagnostic information, and various states of an in-vehicle battery.

Figure 6:
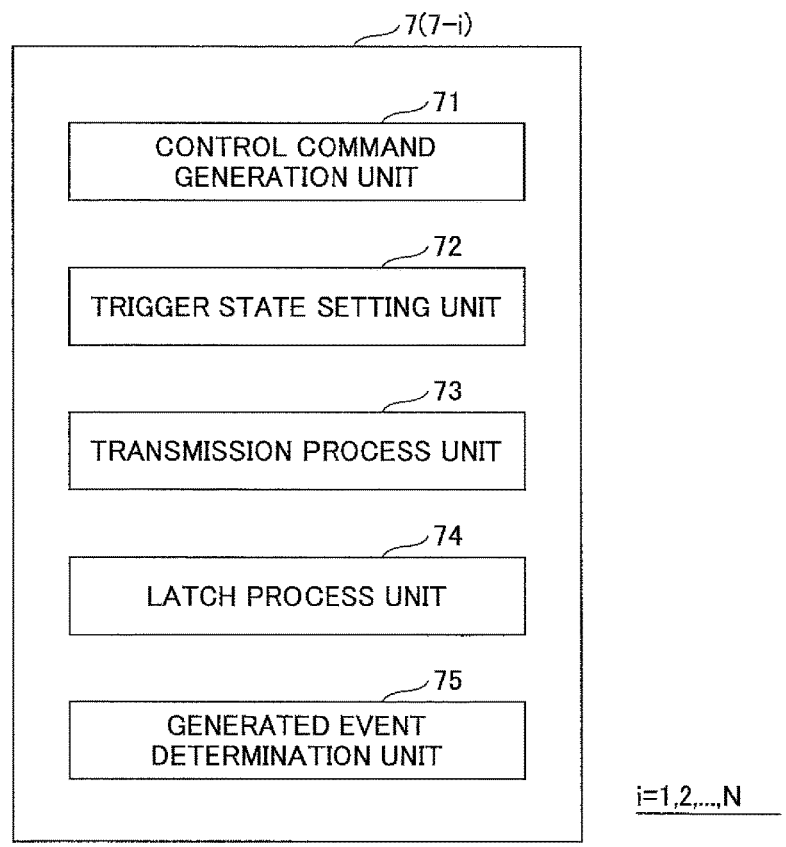
FIG. 6 is a diagram that illustrates an example of functional blocks of an ECU according to an embodiment.

FIG. 6 is a functional block diagram of the various ECUs 7 (an ECU 7-i). Here, a case example will be mainly described in which the ECU 7-i is the PCS-ECU 7-1.

Note that a hardware configuration of the various ECUs 7 (ECU 7-i) is substantially the same as that of the information-recording-ECU 6, and illustration is omitted. Also, functions in the various ECUs 7 (ECU 7-i) may implemented by executing various programs stored in a ROM, on a CPU.

Each of the various ECUs 7 (ECU 7-i) includes a control command generation unit 71, a trigger state setting unit 72, a transmission process unit 73, a latch process unit 74, and a generated event determination unit 75, as functional units that are implemented by executing various programs stored in the ROM, on the CPU.

If one of the various ECUs 7 (ECU 7-i) executes control relating to two or more types of events (for example, executes control relating to multiple drive support functions), the control command generation unit 71, the trigger state setting unit 72, the latch process unit 74, and the generated event determination unit 75 are provided for each type of the events to be controlled (for each of the drive support functions).

The control command generation unit 71 generates a control command relating to an event (for example, a control command relating to actuation of a drive support function, or a control command relating to actuation of a failsafe function for an event caused by a specific operation).

The control command generation unit 71 in the PCS-ECU 7-1 generates a control command relating to "actuation of PCS alarming" and "actuation of PCS braking". Specifically, based on information from at least one of the devices for detection and measurement 8, the control command generation unit 71 determines whether it is necessary to actuate PCS alarming and to actuate PCS braking. For example, the control command generation unit 71 in the PCS-ECU 7-1 calculates a time to collision (TTC) with an obstacle ahead of the vehicle, based on detection information from at least one of the forward radar sensor 8-1 and the forward camera sensor 8-2. Then, if the TTC becomes less than or equal to a predetermined threshold Tth1, the control command generation unit 71 generates an alarm command, and has the transmission process unit 73, which will be described later, transmit the command to the brake-ECU 7-3 via a transceiver unit. Further, if the TTC becomes less than or equal to Tth2 (<Tth1), the control command generation unit 71 generates an automatic braking command, and has the transmission process unit 73, which will be described later, transmit the command to the brake-ECU 7-3 via the transceiver unit. In response to receiving the alarm command, the brake-ECU 7-3 generates a control command, and actuates an alarm buzzer (actuates PCS alarming). Also, in response to receiving the automatic braking command, the brake-ECU 7-3 generates a control command (a command value), and controls a brake actuator that includes various valves, a pump, and an accumulator. In other words, the brake-ECU 7-3 actuates PCS braking by increasing wheel cylinder pressure of the wheels, based on the control value different from a control value that responds to a braking operation by the driver.

The generated event determination unit 75 determines whether a predetermined event has been generated in the vehicle. For example, the generated event determination unit 75 in the PCS-ECU 7-1 determines whether the control command generation unit 71 has generated an alarm command to actuate PCS alarming. The generated event determination unit 75 in the PCS-ECU 7-1 also determines whether the control command generation unit 71 has generated an automatic braking command to actuate PCS braking. In this way, when executing control relating to multiple predetermined events, each of the various ECUs 7 (ECU 7-i) includes the generated event determination units 75 to determine whether the multiple events have been generated in the vehicle for the respective events.

The trigger state setting unit 72 generates information about a trigger to record vehicle data that represents a state of the vehicle or an occupant of the vehicle on the non-volatile memory 14 (trigger information) in the information-recording-ECU 6 (the data recording unit 106, which will be described later). The trigger state setting unit 72 sets the state of a trigger that corresponds to an event determined as generated in the vehicle by the generated event determination unit 75, to a satisfied state. For example, if the generated event determination unit 75 has determined that the control command generation unit 71 has generated an alarm command to actuate PCS alarming, the trigger state setting unit 72 in the PCS-ECU 7-1 sets the state of the trigger that corresponds to generating the alarm command to actuate PCS alarming, to a satisfied state. Similarly, if the generated event determination unit 75 has determined that the control command generation unit 71 has generated an automatic braking command to actuate PCS braking, the trigger state setting unit 72 in the PCS-ECU 7-1 sets the state of the trigger that corresponds to generating the automatic braking command to actuate PCS braking, to a satisfied state.

The transmission process unit 73 transmits a CAN frame to convey the state of the trigger of each of the multiple events (a satisfied state or an unsatisfied state) to the CAN bus 91 or the CAN bus 92. For example, the transmission process unit 73 in the PCS-ECU 7-1 transmits a CAN frame to convey the state of the trigger that corresponds to the alarm command to actuate PCS alarming (PCS alarming trigger), and the state of the trigger that corresponds to the automatic braking command to actuate PCS braking (automatic braking trigger) to the CAN bus 91.

The latch process unit 74 executes a latch process for maintaining the state of the trigger set to the satisfied state until a predetermined time S passes since the trigger state setting unit 72 has set the state of the trigger to the satisfied state, and changing the state of the trigger from the satisfied state to an unsatisfied state after the predetermined time S has passed. For example, the latch process unit 74 in the PCS-ECU 7-1 executes a latch process for maintaining the state of the PCS alarming trigger set to the satisfied state until the predetermined time S passes since the trigger state setting unit 72 has set the state of the PCS alarming trigger to the satisfied state, and changing the state of the PCS alarming trigger from the satisfied state to an unsatisfied state after the predetermined time S has passed. Similarly, the latch process unit 74 in the PCS-ECU 7-1 executes a latch process for maintaining the state of the automatic braking trigger set to the satisfied state until the predetermined time S passes since the trigger state setting unit 72 has set the state of the automatic braking trigger to the satisfied state, and changing the state of the automatic braking trigger from the satisfied state to an unsatisfied state after the predetermined time S has passed. As such, each of the various ECUs 7 (ECU 7-i) includes the latch process unit 74 that executes a latch process for maintaining the state of the trigger set to the satisfied state until a predetermined time S passes since the trigger state setting unit 72 has set the state of the trigger to the satisfied state, and changing the state of the trigger from the satisfied state to an unsatisfied state after the predetermined time S has passed, for the trigger of each of the multiple events.

Figure 7:
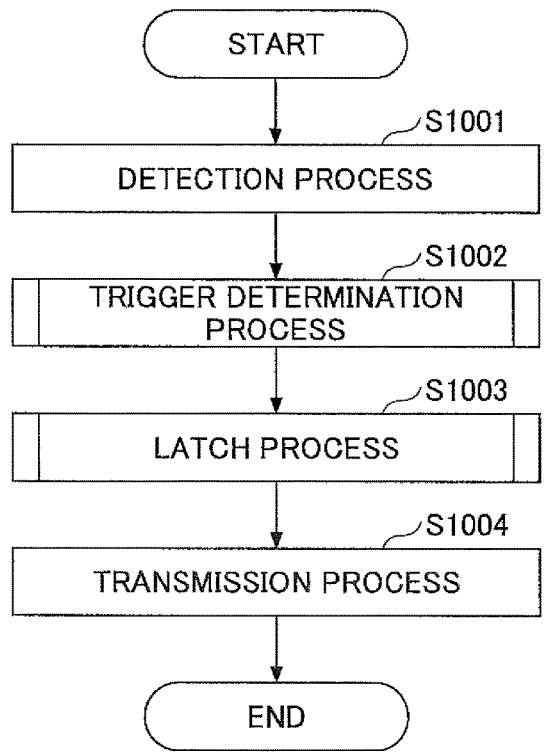
FIG. 7 is a flowchart that schematically illustrates an example of a process by each functional unit of an ECU according to an embodiment.

FIG. 7 is a flowchart that schematically illustrates an example of a main process routine by functional units of the ECU 7. The main process routine by this flowchart is repeatedly executed every predetermined cycle after the vehicle has been started up until the vehicle is stopped. In other words, the process is executed upon starting up the vehicle, and then, repeatedly executed every predetermined cycle until the vehicle is stopped.

Here, Note that "starting up the vehicle" means having the vehicle transition to a state in which the vehicle can travel following operations by the driver, and is a notion including, for example, ignition on (IG-ON) for an engine-driven vehicle, or starting up a control unit (for example, an HV-ECU) that controls the entire vehicle cooperatively for an electric vehicle (including a hybrid vehicle and a range extender vehicle). Also, "the vehicle is stopped" means having the vehicle transition to a state in which the vehicle stops traveling following operations by the driver, and is a notion including, for example, ignition off (IG-OFF) for an engine-driven vehicle, or starting up a control unit for an electric vehicle mentioned above.

At Step S1001, each of the control command generation units 71 provided for the corresponding types of the events executes a detection process for obtaining detection information for executing a trigger determination process at Step S1002 from at least one of the devices for detection and measurement 8.

At Step S1002, with reference to a determination result by the generated event determination unit 75 provided for each corresponding type of the events, the trigger state setting unit 72 provided for each corresponding type of the events executes a trigger determination process for generating information about a trigger (trigger information) for recording vehicle data that represents a state of the vehicle or an occupant of the vehicle on the non-volatile memory 14.

Figure 8:
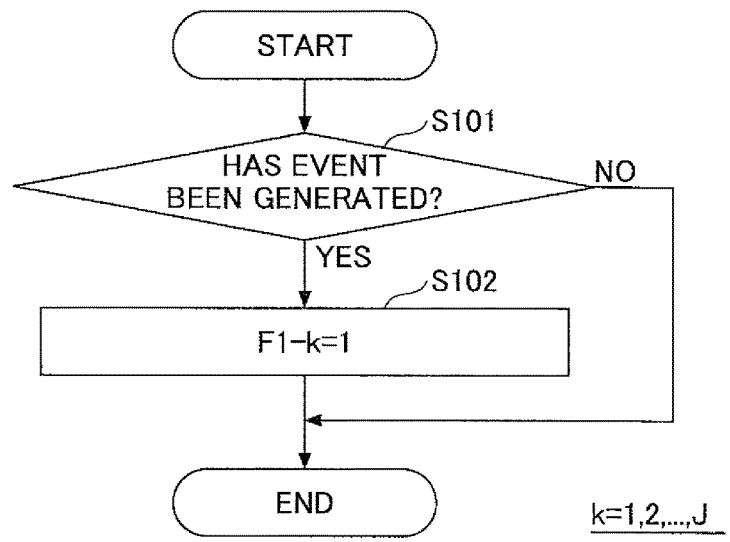
FIG. 8 is a flowchart that schematically illustrates an example of a process by a generated event determination unit and a trigger state setting unit.

FIG. 8 is a flowchart that schematically illustrates an example of the trigger determination process by the generated event determination unit 75 and the trigger state setting unit 72, to illustrate Step S1002 in FIG. 7 in detail. The trigger determination process in FIG. 8 is executed for each type of the events by the generated event determination unit 75 and the trigger state setting unit 72 provided for each corresponding type of the events.

Note that each trigger satisfaction flag F1-1 to F1-J is provided for each type among J-types of events to be detected is a flag to represent whether the trigger is in a satisfied state. In the following, a trigger satisfaction flag F1-k (k=1, 2, . . . , J) refers to an arbitrary one of the trigger satisfaction flags F1-1 to F1-J.

A trigger satisfaction flag F1-k being "1" means that the state of the trigger is in a satisfied state, the trigger satisfaction flag F1-k being "0" means that the state of the trigger is in an unsatisfied state. The initial value of the trigger satisfaction flag F1-k upon starting up the vehicle is "0".

At Step S101, the generated event determination unit 75 determines whether an event that satisfies the trigger has been generated, for example, determines whether the control command generation unit 71 has generated a control command relating to controlling an event. For example, the generated event determination unit 75 in the PCS-ECU 7-1 that corresponds to PCS alarming determines whether a control command relating to actuation of PCS alarming (for example, an alarm command to actuate PCS alarming) has been generated. Similarly, the generated event determination unit 75 in the PCS-ECU 7-1 that corresponds to PCS braking determines whether a control command relating to actuation of PCS braking (for example, an alarm command to actuate PCS alarming) has been generated. If such a determination condition is satisfied, the generated event determination unit 75 goes forward to Step S102, or if not satisfied, ends the trigger determination process, without executing Step S102.

At Step S102, the trigger state setting unit 72 sets the trigger satisfaction flag F1-k to "1", and ends the current trigger determination process.

In this way, the trigger state setting unit 72 periodically generates trigger information that includes the trigger satisfaction flag F1-k representing whether the trigger is satisfied, with reference to a determination result by the generated event determination unit 75.

Then, at Step S1003 in FIG. 7, the latch process unit 74 executes a latch process for maintaining the state of the trigger set to the satisfied state until the predetermined time S passes since the trigger state setting unit 72 has set the state of the trigger to the satisfied state, and changing the state of the trigger from the satisfied state to an unsatisfied state after the predetermined time S has passed.

Next, at Step S1004 in FIG. 7, the transmission process unit 73 executes a transmission process for transmitting a CAN frame to convey the state of the trigger of each of the multiple events (a satisfied state or an unsatisfied state) to the CAN bus 91 or the CAN bus 92.

The transmission process unit 73 executes a process for transmitting a control command generated by the control command generation unit 71, and trigger information generated by the trigger state setting unit 72 with reference to a determination result by the generated event determination unit 75, to a target transmission destination via the transceiver unit. For example, if an object to be controlled is connected with the various ECUs 7 (ECU 7-i) by wire to be capable of communicating with each other, the transmission process unit 73 transmits a control command that the control command generation unit 71 has generated, to the object to be controlled via wire. Also, the transmission process unit 73 outputs the CAN frame that includes the trigger information to the CAN 9 via the transceiver unit (transmits to the information-recording-ECU 6 via the CAN 9).

Figure 9:
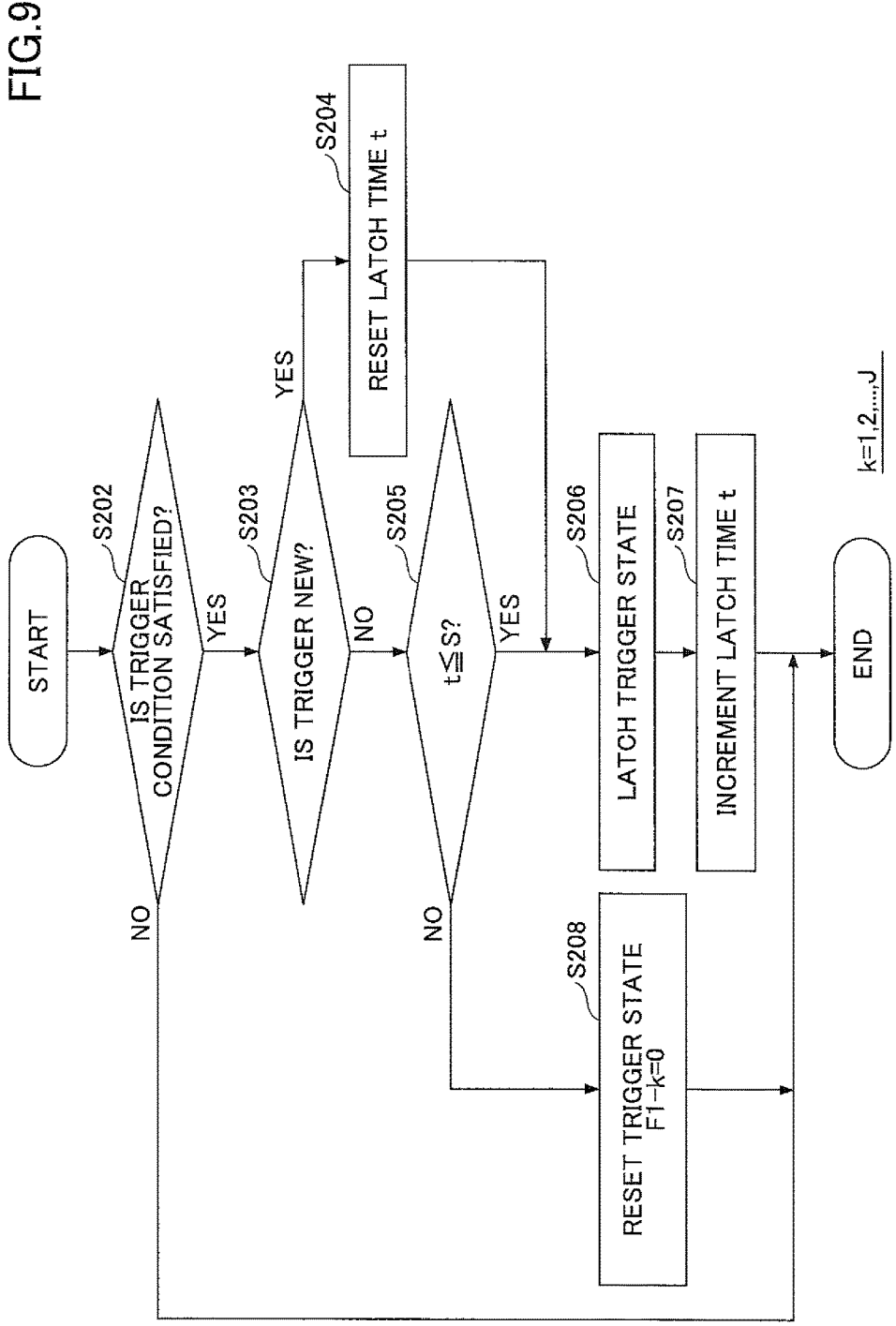
FIG. 9 is a flowchart that schematically illustrates an example of a process by a latch process unit.

FIG. 9 is a flowchart that schematically illustrates an example of the latch process by the latch process unit 74, to illustrate Step S1003 in FIG. 7 in detail. The latch process in FIG. 9 is executed by the latch process unit 74 provided for each corresponding type of the events for each type of the events.

At Step S202, the latch process unit 74 determines whether the state of the trigger at a current moment is in a satisfied state or an unsatisfied state following the value of the trigger satisfaction flag F1-k at the current moment. If having determined that the state of the trigger is in an unsatisfied state by detecting that the value of the trigger satisfaction flag F1-k is "0", the latch process unit 74 ends the current latch process. On the other hand, if having determined that the state of the trigger is in a satisfied state by detecting that the value of the trigger satisfaction flag F1-k is "1", the latch process unit 74 goes forward to Step S203.

At Step S203, the latch process unit 74 determines whether the trigger is newly satisfied in the current main process routine (see FIG. 7). In other words, the latch process unit 74 determines whether the trigger satisfaction flag F1-k has been set to "1" from "0" at Step S102 in the trigger determination process in FIG. 8 during the execution of the current main process routine (whether the state of the trigger has been set to a satisfied state from an unsatisfied state).

At Step S203, if having determined that the trigger satisfaction flag F1-k has been set to "1" from "0" in the current main process routine, the latch process unit 74 goes forward to Step S204.

At Step S204, the latch process unit 74 resets a time to maintain the value of the trigger satisfaction flag F1-k to "1" (latch time t), and goes forward to Step S206.

The latch process unit 74 latches the state of the trigger at Step S206, and increments the latch time t at Step S207. Thus, the latch process unit 74 can maintain the trigger satisfaction flag F1-k to "1" (can maintain the state of the trigger to the satisfied state). After Step S207, the latch process unit 74 ends the current latch process.

On the other hand, at Step S203, if having determined that the trigger satisfaction flag F1-k has been set to "1" from "0" in the previous main process routine or earlier, the latch process unit 74 goes forward to Step S205.

At Step S205, the latch process unit 74 determines whether the latch time t is less than or equal to the predetermined time S described above, in other words, determines whether the latch time t has passed the predetermined time S.

If having determined at Step S205 that the latch time t has not passed the predetermined time S, the latch process unit 74 goes forward to Step S206, and goes forward to Step S207. Thus, the latch process unit 74 can maintain the trigger satisfaction flag F1-k to "1" (can maintain the state of the trigger to the satisfied state).

On the other hand, if having determined at Step S205 that the latch time t has passed the predetermined time S, the latch process unit 74 goes forward to Step S208. At Step S208, the latch process unit 74 releases the latched state of the trigger. In other words, the latch process unit 74 resets the trigger satisfaction flag F1-k to "0" from "1" (changes the state of the trigger from the satisfied state to an unsatisfied state). After Step S208, the latch process unit 74 ends the current latch process.

Therefore, by the process illustrated in FIG. 9, the latch process unit 74 can execute a latch process for maintaining the state of the trigger set to the satisfied state until the predetermined time S passes since the trigger state setting unit 72 has set the state of the trigger to the satisfied state, and changing the state of the trigger from the satisfied state to an unsatisfied state after the predetermined time S has passed.

Next, with reference to FIG. 10, specific contents of processing by the information-recording-ECU 6 will be described.

Figure 10:
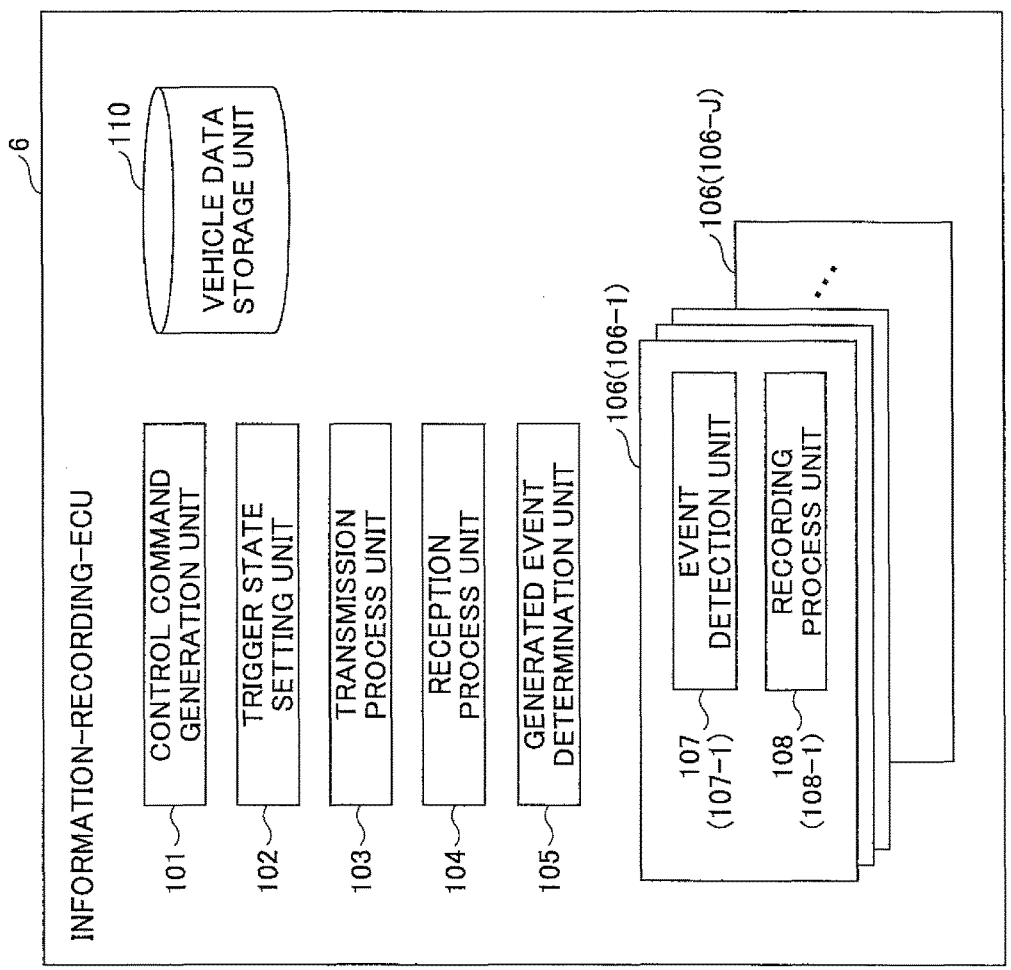
FIG. 10 is a diagram that illustrates an example of functional blocks of an information-recording-ECU according to an embodiment.

FIG. 10 is a functional block diagram of an information-recording-ECU 6. Functional blocks except for the vehicle data storage unit 110 can be implemented by executing various programs stored in the ROM 13 on the CPU 11. Also, the vehicle data storage unit 110 is implemented by a storage area specified in advance on the non-volatile memory 14.

The control command generation unit 101 generates a control command relating to a predetermined type of an event as done by the control command generation unit 71 of the various ECUs 7 (ECU 7-i). However, the control command generation unit 101 generates a control command relating to a type of an event that is different from events processed by the various ECUs 7 (ECU 7-i). The control command generation unit 101 generates a control command relating to, for example, "actuation of an auxiliary device for occupant protection (for example, a seat belt pretensioner)". The control command generation unit 101 generates such a control command (an actuation command) if a predetermined operational condition is satisfied, and the transmission process unit 103, which will be described later, transmits the command to the auxiliary device for occupant protection via the transceiver unit 25.

As done by the trigger state setting unit 72 and the generated event determination unit 75 of the various ECUs 7 (ECU 7-i), with reference to a determination result by the generated event determination unit 105, the trigger state setting unit 102 generates information about a trigger (trigger information) to record vehicle data that corresponds to a predetermined type of an event ("actuation of the auxiliary device for occupant protection"). Specifically, following the flowchart illustrated in FIG. 8 (Steps S101 and S102), the trigger state setting unit 102 sets the trigger satisfaction flag F1-J, and generates trigger information that includes the trigger satisfaction flag F1-J.

Note that in an aspect, the information-recording-ECU 6 may not execute control relating to a type of an event to be detected (control relating to actuation of an "auxiliary device for occupant protection"). In other words, the information-recording-ECU 6 may be configured to specialize in a process for detecting types of events to be controlled by the various. ECUs 7 (ECU 7-i), and recording vehicle data that corresponds to the detected types of events. In such a case, the control command generation unit 101, the trigger state setting unit 102, and the generated event determination unit 105 are omitted.

The transmission process unit 103 executes a process for outputting a control command generated by the control command generation unit 101 to a transmission destination to be controlled via the transceiver unit.

The reception process unit 104 executes a process for receiving a communication frame (a CAN frame) received from the CAN 9 via the transceiver unit 25.

The data recording unit 106 includes the data recording units 106-1 to 106-J provided for each type of events to be detected. The data recording units 106-1 to 106-J include the data recording units 106-1 to 106-H provided for the various ECUs 7 (ECU 7-i), and the data recording unit 106-J provided for the information-recording-ECU 6 itself (H=J-1). In the following, the data recording unit 106-k (k=1, 2, ..., J) refers to an arbitrary one of the data recording units 106-1 to 106-J. The data recording unit 106 is an example of a data recording unit to record vehicle data that corresponds to a trigger in a satisfied state among triggers of multiple events in a communication frame received from a second in-vehicle network on a non-volatile memory.

The data recording unit 106 includes an event detection unit 107 and a recording process unit 108. The event detection unit 107 and the recording process unit 108 include event detection units 107-1 to 107-J, and recording process units 108-1 to 108-J that correspond to the data recording units 106-1 to 106-J (namely, provided for types of events to be detected), respectively. In the following, the event detection unit 107-k refers to an arbitrary one of the event detection units 107-1 to 107-J. Also, the recording process unit 108-k refers to an arbitrary one of the recording process units 108-1 to 108-J.

Functions of the event detection units 107-1 to 107-J and the recording process units 108-1 to 108-J are just different in terms of types of events to be processed, and are substantially the same. Therefore, the event detection unit 107-k and the recording process unit 108-k will be described in the following unless particularly noted.

The event detection unit 107-k detects a type of an event that corresponds a trigger to record vehicle data, based on trigger information received by the reception process unit 104 from the ECU 7 via the transceiver unit 25 and the CAN 9, or trigger information generated by the trigger state setting unit 102. Then, except for a specific case (a case in which a mask condition is satisfied, which will be described later), if having detected a corresponding type of an event, the event detection unit 107-k outputs a write request for recording vehicle data upon the detection (a type of vehicle data specified in advance for the corresponding type of an event) on the vehicle data storage unit 110. In the following, a process by the event detection unit 107-k will be described with reference to FIG. 11.

Figure 11:
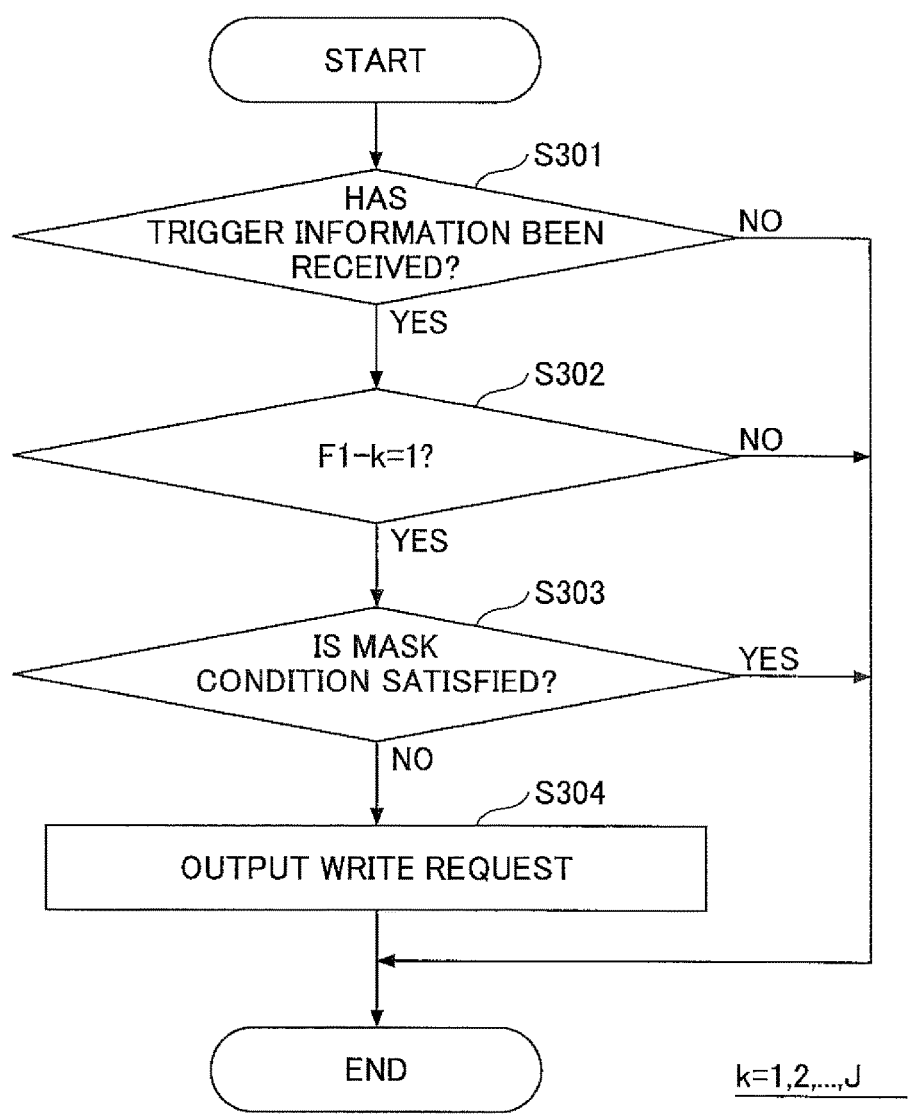
FIG. 11 is a flowchart that schematically illustrates an example of an event detection process by an event detection unit.

FIG. 11 is a flowchart that schematically illustrates an example of a process by the event detection unit 107-k. The process by the flowchart is repeatedly executed every predetermined cycle after the vehicle has been started up until the vehicle is stopped.

At Step S301, the event detection unit 107-k determines whether the reception process unit 104 has received trigger information about a corresponding type of an event via the transceiver unit 25. If trigger information has been received, the event detection unit 107-k goes forward to Step S302; or if trigger information has not been received, ends the current process.

Note that to detect "actuation of an auxiliary device for occupant protection", the event detection unit 107-J uses trigger information generated by the trigger state setting unit 102. Therefore, Step S301 by the event detection unit 107-J may be skipped, and may go to Step S302 always assuming that the trigger information has been received.

At Step S302, the event detection unit 107-k determines whether the trigger satisfaction flag F1-k included in the trigger information about the corresponding type of the event is "1". If the trigger satisfaction flag F1-k is "1", the event detection unit 107-k determines that the trigger about the corresponding type of the event has been satisfied, namely, the corresponding type of the event has been detected, and goes forward to Step S303; or if the flag is not "1"(is "0"), ends the current process.

At Step S303, the event detection unit 107-k determines whether a mask condition is satisfied. As will be described later, the mask condition is a condition to prevent a duplicated write of vehicle data buffered periodically into the vehicle data storage unit 110. A mask condition may be, for example, "corresponding types of events have been detected consecutively by the process by the flowchart". If a mask condition is not satisfied, the event detection unit 107-k goes forward to Step S304; or if the mask condition is satisfied, ends the current process.

At Step S304, the event detection unit 107-k outputs a write request, and ends the current process.

Referring back to FIG. 10, if the event detection unit 107-k detects a corresponding type of an event, the recording process unit 108-k records the corresponding vehicle data on the vehicle data storage unit 110 in a predetermined period that corresponds to the detection. Specifically, every predetermined cycle, the recording process unit 108-k buffers vehicle data specified in advance for a corresponding type of an event, and if a write request is output from the event detection unit 107-k during the buffering, executes a process for writing the buffered vehicle data in the recording area allocated on the vehicle data storage unit 110. In the following, with reference to FIG. 12, a flow of a process by the recording process unit 108-k will be described.

Note that the "predetermined period that corresponds to the detection" is a notion including, for example, a period that includes a moment at which a corresponding type of an event has been detected, and before and after the moment; a period starting from the detected moment; a period ending at the detected moment; a period starting after the moment of the detection; and a period ending before the moment of the detection. In other words, periods of vehicle data useful for analysis may differ depending on types of events. Therefore, the length, the start time, and the like of a predetermined period are specified in advance for each type of the events. However, in the embodiment, as described above, if a corresponding event is detected during the buffering executed every predetermined cycle, the corresponding vehicle data that has been buffered is recorded; namely, the vehicle data during a predetermined period that includes the moment at which the corresponding type of the event has been detected, and before and after the moment.

Figure 12:
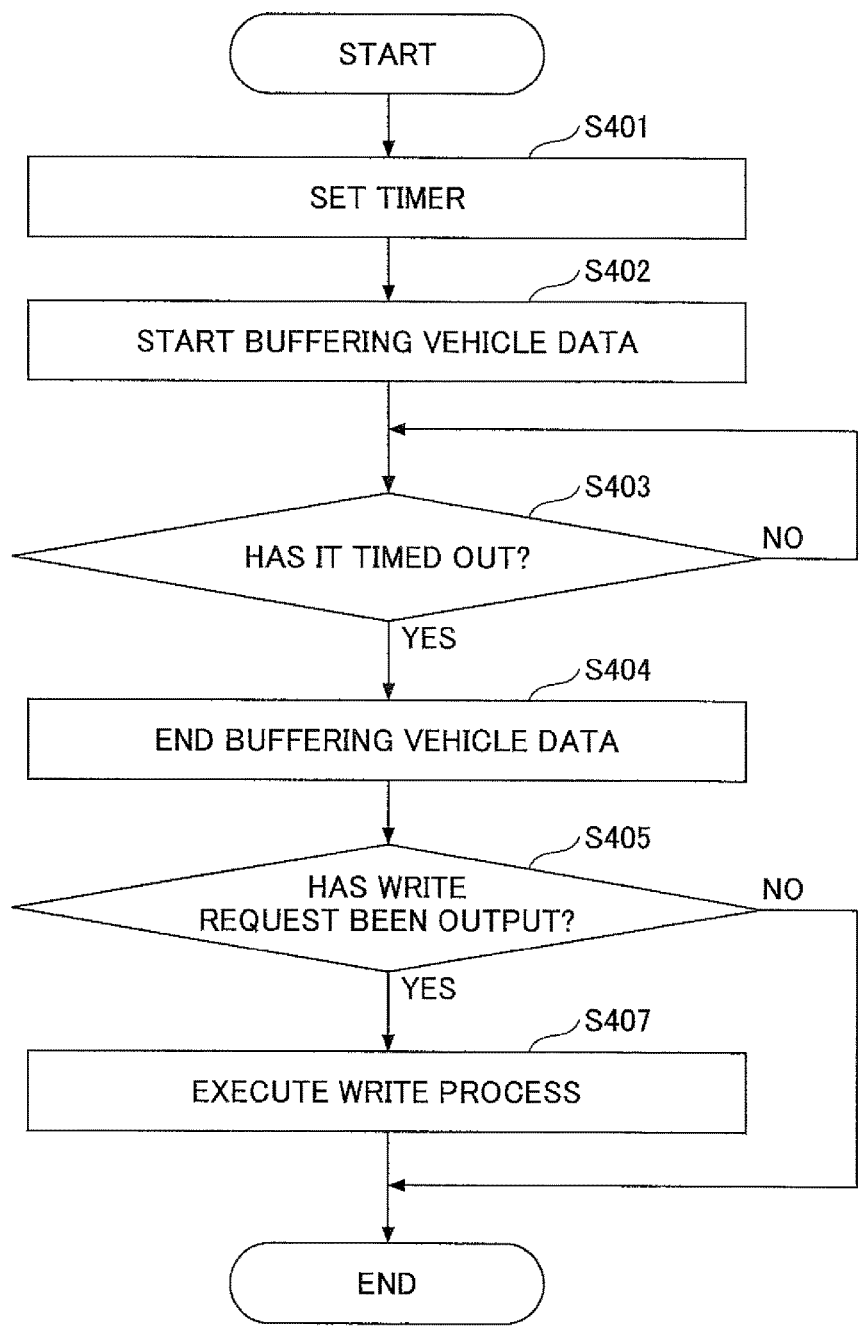
FIG. 12 is a flowchart that schematically illustrates an example of a data recording process by a recording process unit.

FIG. 12 is a flowchart schematically illustrates an example of a data recording process by the recording process unit 108-k. The process by the flowchart is repeatedly executed every predetermined cycle after the vehicle has been started up until the vehicle is stopped.

At Step S401, the recording process unit 108-k sets a timer.

Note that the timer times out when a time specified in advance (record time T1) passes, and the record time T1 is specified in advance for each corresponding type of the events.

At Step S402, the recording process unit 108-k starts buffering vehicle data that is specified in advance for each corresponding type of the events. Buffering vehicle data is executed, for example, by using a ring buffer in the RAM 12 set for each corresponding type of the events.

At Step S403, the recording process unit 108-k determines whether the timer has timed out. If the timer has timed out, the recording process unit 108-k goes forward to Step S404; or if not timed out, repeats the step until the time-out.

At Step S404, the recording process unit 108-k ends buffering the vehicle data that is specified in advance for each corresponding type of the events.

At Step S405, the recording process unit 108-k determines whether a write request about a corresponding type of an event has been output from the event detection unit 107-k during the buffering the vehicle data by this flow. If a write request has been output, the recording process unit 108-k goes forward to Step S406; or if a write request has not been output, ends the current process.

At Step S407, the recording process unit 108-k executes a process for writing the vehicle data buffered in the ring buffer in the recording area on the vehicle data storage unit 110, and ends the current process.

In this way, by the process by this flow, if the event detection unit 107-k detects a corresponding type of an event, and outputs a write request during buffering vehicle data specified in advance for a corresponding type of an event, the buffered vehicle data is recorded in the recording area allocated on the vehicle data storage unit 110 after the buffering has ended.

Figure 13:
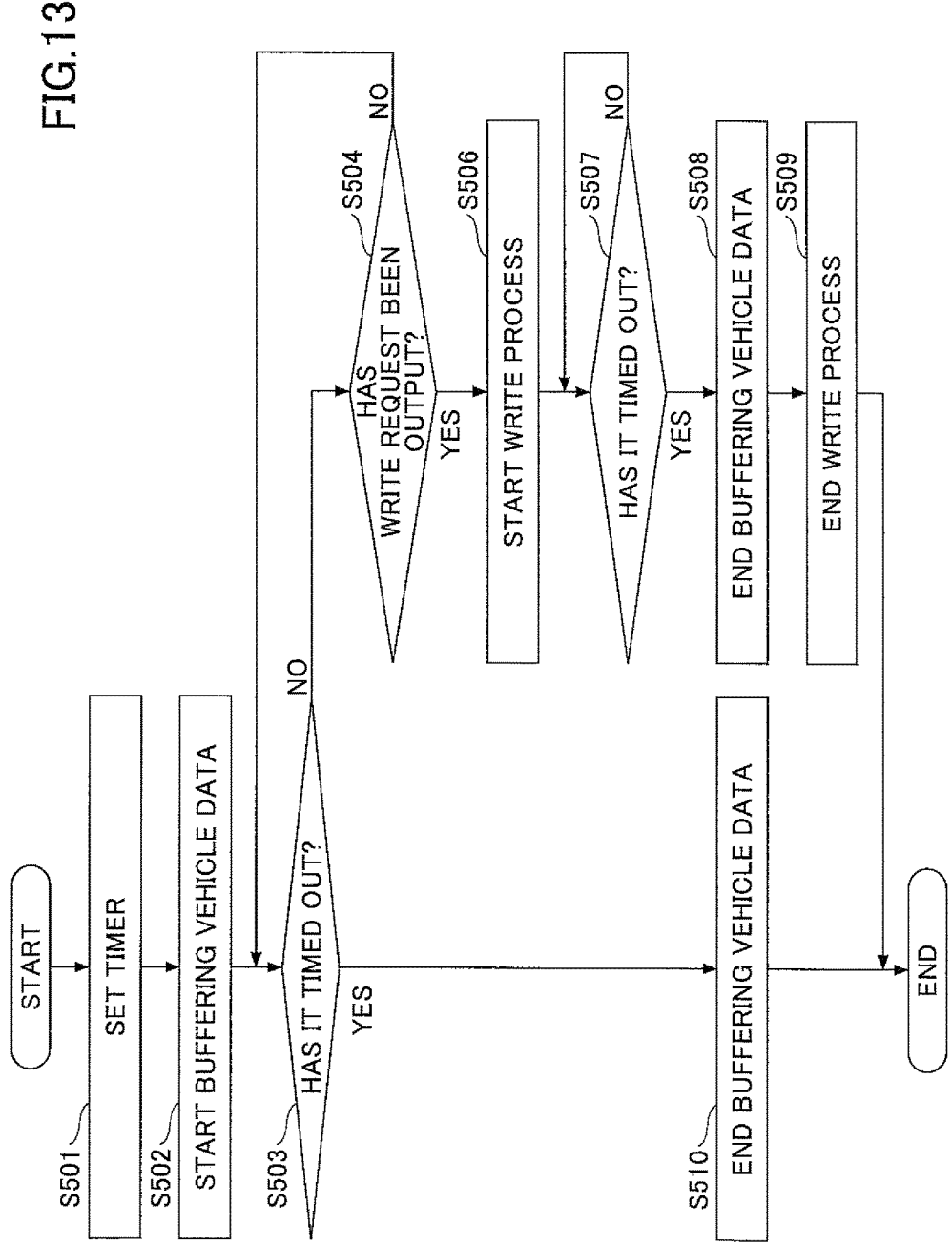
FIG. 13 is a flowchart that schematically illustrates another example of a data recording process by a recording process unit.

Next, FIG. 13 is a flowchart that schematically illustrates another example of a data recording process by the recording process unit 108-k. Similar to FIG. 12, the process by the flowchart is repeatedly executed every predetermined cycle after the vehicle has been started up until the vehicle is stopped.

At Step S501, the recording process unit 108-k sets a timer as done at Step S401.

At Step S502, the recording process unit 108-k starts buffering vehicle data that is specified in advance for each corresponding type of the events as done at Step S402.

At Step S503, the recording process unit 108-k determines whether the timer has timed out. If the timer has timed out, the recording process unit 108-k goes forward to Step S510, ends buffering the vehicle data that is specified in advance for each corresponding type of the events, and ends the current process. If the timer has not timed out, the recording process unit 108-k goes forward to Step S504.

At Step S504, the recording process unit 108-k determines whether a write request about a corresponding type of an event has been output from the event detection unit 107-k. If a write request has been output, the recording process unit 108-k goes forward to Step S506; or if a write request has not been output, goes back to Step S503, and repeats Steps S503 and S504.

At Step S506, the recording process unit 108-k starts a process for writing the vehicle data buffered in the ring buffer in the recording area on the vehicle data storage unit 110.

At Step S507, the recording process unit 108-k determines whether the timer has timed out. If the timer has timed out, the recording process unit 108-k goes forward to Step S508; or if not timed out, repeats the step until the time-out.

At Step S508, the recording process unit 108-k ends buffering the vehicle data that is specified in advance for each corresponding type of the events.

Then, at Step S509, the recording process unit 108-k ends the current process when the write process end.

In this way, by the process by this flow, if the event detection unit 107-k detects a corresponding type of an event, and outputs a write request, recording is immediately started for the buffered vehicle data onto the recording area allocated on the vehicle data storage unit 110. Especially for a type of an event relating to a collision of the vehicle (for example, "actuation of PCS braking"), if a write process starting upon completion of the buffering is adopted, vehicle data may not be recorded on the vehicle data storage unit 110 due to a collision during the buffering. Therefore, by adopting the process by this flow, vehicle data being buffered can be securely recorded.

If vehicle data fills the recording area allocated for a corresponding type of an event, the recording process unit 108-k writes newly buffered vehicle data to be recorded over old recorded vehicle data. Also, vehicle data recorded by the recording process unit 108-k can be taken out to the outside, for example, by having an external tool (a fault diagnosis tool) connected to the CAN 9 via a DLC3 connector or the like provided in the vehicle, and transmitting a command from the external tool to the information-recording-ECU 6.

Next, with reference to FIG. 14, an operational timing chart of the in-vehicle recording system I will be described according to the embodiment.

FIG. 14 is an operational timing chart of the in-vehicle recording system 1 according to the embodiment. FIG. 14 illustrates a case example in which the ECU 7 has transmitted a first communication frame 331 that includes a state "1" of a first trigger 321 corresponding to an earlier event, and then, transmits a second communication frame 332 that includes the state "1" of a second trigger 322 corresponding to a later event. In this case, having determined that the earlier event has been generated, the ECU 7 transmits the first communication frame 331 that includes the first trigger 321 having the state set to "1", which corresponds to the earlier event, to issue a command to the information-recording-ECU 6 to record vehicle data corresponding to the earlier event on the non-volatile memory 14. After that, having determined that the later event has been generated, the ECU 7 transmits the second communication frame 332 that includes the second trigger 322 having the state set to "1", which corresponds to the later event, to issue a command to the information-recording-ECU 6 to record vehicle data corresponding to the later event on the non-volatile memory 14. Note that both the first communication frame 231 and the second communication frame 232 in the figure schematically illustrate examples of a data frame that can convey five states of respective triggers.

In the following, it is assumed that the generated event determination unit 75 provided for first trigger 321 corresponds to the generated event determination unit 75-1, and the generated event determination unit 75 provided for second trigger 322 corresponds to the generated event determination unit 75-2. Also, the trigger state setting unit 72 provided for the first trigger 321 corresponds to the trigger state setting unit 72-1, and the trigger state setting unit 72 provided for the second trigger 322 corresponds to the trigger state setting unit 72-2. Also, the latch process unit 74 provided for the first trigger 321 corresponds to the latch process unit 74-1.

According to the embodiment, in the ECU 7, if the generated event determination unit 75-1 has determined that an event corresponding to the first trigger 321 has been generated, the trigger state setting unit 72-1 sets the state of the first trigger 321 to a satisfied state (the trigger satisfaction flag F1-1="1"). Then, the satisfied state of the first trigger 321 (the trigger satisfaction flag F1-1="1") set by the trigger state setting unit 72-1, is transmitted to the CAN bus 91 with the first communication frame 331 by the transmission process unit 73, and is maintained by the latch process unit 74-1 until the predetermined time S passes.

Then, after the generated event determination unit 75-1 has determined that the event corresponding to the first trigger 321 has been generated, suppose that a later event (in the case of FIG. 14, the event that corresponds to the second trigger 322) different from the event (namely, the earlier event) is generated in the predetermined time S. In this case, the transmission process unit 73 transmits to the CAN bus 91 a second communication frame 332 to convey the satisfied state "1" of the first trigger 321 maintained by the latch process unit 74-1, and the satisfied state "1" of the second trigger 322 set by the trigger state setting unit 72-2.

Therefore, even if the first communication frame 331 to convey the satisfied state "1" of the first trigger 321 is not relayed by the gateway device 94 to the CAN bus 93, the gateway device 94 can relay the second communication frame 332 to convey the satisfied state "1" of the first trigger 321 and the satisfied state "1" of the second trigger 322 to the CAN bus 93. Therefore, the information-recording-ECU 6 can record vehicle data that corresponds to the first trigger 321 and vehicle data that corresponds to the second trigger 322 on the non-volatile memory 14.

Also, for example, the predetermined time S is set greater than or equal to a total time (U+T) of a first delay time U after a communication frame has been transmitted to the CAN bus 91 until the communication frame is received by the gateway device 94, and a second delay time (a relaying delay time T) for relaying the communication frame from the CAN bus 91 to the CAN bus 93 by the gateway device 94.

By setting the predetermined time S in this way, in the ECU 7, if the generated event determination unit 75-1 has determined that an event corresponding to the first trigger 321 has been generated, the satisfied state of the first trigger 321 (the trigger satisfaction flag F1-1 "1") is maintained by the latch process unit 74-1 for the total time (U+T) or longer. Therefore, after the generated event determination unit 75-1 has determined that an event corresponding to the first trigger 321 has been generated, and then, if a later event different from the event (namely, the earlier event) is generated after the total time (U+T) or later, the transmission process unit 73 can transmit to the CAN bus 91 a second communication frame 332 to convey the satisfied state "1" of the first trigger 321 maintained by the latch process unit 74-1, and the satisfied state "1" of the second trigger 322 set by the trigger state setting unit 72-2.

Therefore, even if different events are generated consecutively within the total time (U+T), the gateway device 94 can relay the second communication frame 332 to convey the satisfied state "1" of the first trigger 321 and the satisfied state "1" of the second trigger 322 to the CAN bus 93. Therefore, the information-recording-ECU 6 can record vehicle data that corresponds to the first trigger 321 and vehicle data that corresponds to the second trigger 322 on the non-volatile memory 14.

So far, the in-vehicle recording system and the in-vehicle control apparatus have been described with the embodiments. Note that the present invention is not limited to the above embodiments. Various modifications and improvements can be made within the scope of the present invention, by combining and/or replacing a part of or all of the embodiments with the others.

The present application is based on and claims the benefit of priority of Japanese Priority Application No. 2015-206663, filed on Oct. 20, 2015, the entire contents of which are hereby incorporated by reference.

The invention claimed is:

1. An in-vehicle recording system, comprising:
a first processor and memory configured
to transmit to a first in-vehicle network a state of a trigger for recording state data that represents a state of a vehicle or an occupant of the vehicle, on a non-volatile memory;
a gateway device configured to
relay the state of the trigger transmitted to the first in-vehicle network, from the first in-vehicle network to a second in-vehicle network; and
a second processor and second memory configured
to receive from the second in-vehicle network, the state of the trigger relayed by the first processor from the first in-vehicle network to the second in-vehicle network;
wherein the first processor and memory are further configured to:
determine whether a plurality of predetermined events have been generated in the vehicle, for each of the events,
set the state of the trigger corresponding to the event having been determined as generated in the vehicle, to a satisfied state, and
transmit a communication frame that conveys the state of the trigger for each of the events, to the first in-vehicle network, wherein the gateway device is configured to relay a second communication frame from the first in-vehicle network to the second in-vehicle network, without relaying a first communication frame, in a case where the gateway device has received the second communication frame different from the first communication frame from the first in-vehicle network after having received the first communication frame from the first in-vehicle network, before relaying the first communication frame to the second in-vehicle network, wherein the second processor and memory are further configured to record the state data corresponding to the trigger set to the satisfied state among the triggers of the events in a communication frame received from the second in-vehicle network, on the non-volatile memory, wherein the first processor and memory are further configured to execute a latch process for maintaining the state of the trigger set to the satisfied state until a predetermined time passes since the first processor has set the state of the trigger to the satisfied state, and changing the state of the trigger from the satisfied state to an unsatisfied state after the predetermined time has passed, for each of the triggers of the events.

2. The in-vehicle recording system as claimed in claim 1, wherein the predetermined time is greater than or equal to a total time of a first delay time after a communication frame has been transmitted to the first in-vehicle network until the communication frame is received by the gateway device, and a second delay time for relaying the communication frame from the first in-vehicle network to the second in-vehicle network by the gateway device.

3. An in-vehicle control apparatus configured to transmit to a first in-vehicle network a state of a trigger for recording state data that represents a state of a vehicle or an occupant of the vehicle, on a non-volatile memory, and to be connected via the first in-vehicle network with a gateway device configured to relay a second communication frame from the first in-vehicle network to a second in-vehicle network, without relaying a first communication frame, in a case where the gateway device has received the second communication frame different from the first communication frame from the first in-vehicle network after having received the first communication frame from the first in-vehicle network, before relaying the first communication frame to the second in-vehicle network, the in-vehicle control apparatus, comprising a processor and memory configured to:

determine whether a plurality of predetermined events have been generated in the vehicle, for each of the events;

set the state of the trigger corresponding to the event having been determined as generated in the vehicle by the processor, to a satisfied state;

transmit a communication frame that conveys the state of the trigger for each of the events, to the first in-vehicle network; and execute a latch process for maintaining the state of the trigger set to the satisfied state until a predetermined time passes since the processor has set the state of the trigger to the satisfied state, and changing the state of the trigger from the satisfied state to an unsatisfied state after the predetermined time has passed, for each of the triggers of the events.

4. The in-vehicle control apparatus as claimed in claim 3, wherein the predetermined time is greater than or equal to a total time of a first delay time after a communication frame has been transmitted to the first in-vehicle network until the communication frame is received by the gateway device, and a second delay time for relaying the communication frame from the first in-vehicle network to the second in-vehicle network by the gateway device.

\* \* \* \* \*